US012674387B2

(12) United States Patent
Bryant et al.

(10) Patent No.: US 12,674,387 B2
(45) Date of Patent: Jul. 7, 2026

(54) USER INTERFACE FOR PROVIDING GUIDANCE ON DRILLING OPERATIONS AND DYNAMIC REPORTING OF RELEVANT DATA

(71) Applicant: Schlumberger Technology Corporation, Sugar Land, TX (US)

(72) Inventors: Jason Bryant, Houston, TX (US); Rodrigo Gallo Covarrubias, Katy, TX (US); Daniel Abad, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 858 days.

(21) Appl. No.: 17/997,609

(22) PCT Filed: Apr. 28, 2021

(86) PCT No.: PCT/US2021/029663
§ 371 (c)(1),
(2) Date: Oct. 31, 2022

(87) PCT Pub. No.: WO2021/222419
PCT Pub. Date: Nov. 4, 2021

(65) Prior Publication Data
US 2023/0220765 A1 Jul. 13, 2023

Related U.S. Application Data

(60) Provisional application No. 63/018,986, filed on May 1, 2020.

(51) Int. Cl.
*E21B 47/12* (2012.01)
*E21B 44/00* (2006.01)
(Continued)

(52) U.S. Cl.
CPC .............. *E21B 47/12* (2013.01); *E21B 44/00* (2013.01); *G06Q 10/0631* (2013.01); *G06Q 50/02* (2013.01); *G06F 3/0481* (2013.01)

(58) Field of Classification Search
CPC ..... E21B 47/12; E21B 44/00; G06Q 10/0631; G06Q 50/02; G06F 3/0481
See application file for complete search history.

(56) References Cited

U.S. PATENT DOCUMENTS 6,152,246 A 11/2000 King et al.
10,533,409 B2 1/2020 Benson
(Continued)

FOREIGN PATENT DOCUMENTS

WO 2005001661 A2 1/2005
WO 2015168706 A1 11/2015
(Continued)

OTHER PUBLICATIONS

Schlumberger: "While-Drilling Formation Evaluation and Interpretation Guides Geosteering to Target Zones, North Sea", retrieved from the Internet on Apr. 11, 2024 at [www.slb.com/resource-library/case-study/so/formation-evaluation-north-sea-cs], 2016, 2 pages.
(Continued)

*Primary Examiner* — Robert E Fennema
*Assistant Examiner* — Yvonne Trang Follansbee
(74) *Attorney, Agent, or Firm* — Kyle R. Miiller

(57) ABSTRACT

Methods, computing systems, and computer-readable media for dynamically presenting different types of data in an interface at different stages of a plan based on the monitoring the progression of the plan. The method includes receiving a selection of a goal for an operation, determining a plan based on the selected goal, determining different types of data to present at different stages of the plan, continuously receiving data representing one or more measurements taken
(Continued)

during the operation, identifying a progression of the plan based on the continuously receiving the data, and dynamically presenting the different types of data in an interface at different stages of the plan based on the identifying the progression of the plan. The dynamically presenting the different types of data directs a user's attention to the different types of data relevant at the different stages of the plan.

21 Claims, 9 Drawing Sheets

(51) Int. Cl.
*G06F 3/0481* (2022.01)
*G06Q 10/0631* (2023.01)
*G06Q 50/02* (2024.01)

(56) References Cited

U.S. PATENT DOCUMENTS

| | | | | |
|---|---|---|---|---|
| 10,976,903 | B2 * | 4/2021 | Hournbuckle, Jr. | ......................... |
| | | | | G06F 3/04842 |
| 2005/0209912 | A1 * | 9/2005 | Veeningen | ............. G06Q 10/10 |
| | | | | 705/7.12 |
| 2009/0225630 | A1 | 9/2009 | Zheng | |
| 2009/0235194 | A1 * | 9/2009 | Arndt | ..................... G06F 9/451 |
| | | | | 715/772 |
| 2010/0133008 | A1 | 6/2010 | Gawski et al. | |
| 2014/0246238 | A1 | 9/2014 | Abbassian | |
| 2014/0299378 | A1 | 10/2014 | Abbassian et al. | |
| 2015/0014058 | A1 | 1/2015 | Wassell et al. | |
| 2017/0218746 | A1 | 8/2017 | Shanmugam et al. | |
| 2024/0295172 | A1 * | 9/2024 | Benson | ..................... E21B 7/04 |

FOREIGN PATENT DOCUMENTS

| | | | |
|---|---|---|---|
| WO | 2019051435 | A1 | 3/2019 |
| WO | 2019222033 | A1 | 11/2019 |
| WO | 2020061195 | A2 | 3/2020 |

OTHER PUBLICATIONS

Louis, A. et al. "Well Data Acquisition Strategies", SPE 63284, presented at the 2000 SPE Annual Technical Conference and Exhibition, Dallas, TX, 2000, 9 pages.

Extended Search Report issued in European Patent Application No. 21795255.5 dated Apr. 22, 2024, 10 pages.

Search Report and Written Opinion of International Patent Application No. PCT/US2021/029663 dated Aug. 10, 2021, 11 pages.

* cited by examiner

SYSTEM 100

MANAGEMENT COMPONENTS 110

SEISMIC DATA 112

OTHER INFORMATION 114

PROCESSING 116

ENTITIES 122

SIMULATION 120

ATTRIBUTE 130

ANALYSIS/ VISUALIZATION 142

OTHER WORKFLOW 144

FRAMEWORK 170

MODULES 174

MODEL SIMULATION 180

FRAMEWORK SERVICES 190

FRAMEWORK CORE 194

DOMAIN OBJECTS 182

DATA SOURCE 184

RENDERING 186

USER INTERFACES 188

160

GEOLOGIC ENVIRONMENT 140
(E.G., SENSING, DRILLING, INJECTING, EXTRACTING, ETC.)

144

1000

148

147

142

146

0

1000

149

143-2

2000

143-1

144

3000

4000

141

4000

310

DATA WINDOW

PLAN WINDOW

310

DATA WINDOW

PLAN WINDOW

400 ⟍

410 ⟍

RECEIVE SELECTION OF GOAL

420 ⟍

DETERMINE PLAN BASED ON SELECTED GOAL AND CURRENT STATE

430 ⟍

DETERMINE DISPLAY PARAMETERS FOR ACTIONS

440 ⟍

MONITOR PROGRESSION OF PLAN AND ACQUIRE DATA

450 ⟍

PRESENT DATA RELEVANT TO STAGE IN PLAN IN ACCORDANCE
WITH DISPLAY PARAMETERS

USER INTERFACE FOR PROVIDING GUIDANCE ON DRILLING OPERATIONS AND DYNAMIC REPORTING OF RELEVANT DATA

CROSS REFERENCE PARAGRAPH

This application is a National Stage Entry of International Application No. PCT/US2021/029663, filed Apr. 28, 2021, which claims the benefit of U.S. Provisional Application No. 63/018,986, entitled "USER INTERFACE FOR PROVIDING GUIDANCE ON DRILLING OPERATIONS AND DYNAMIC REPORTING OF RELEVANT DATA," filed May 1, 2020, the disclosure of which is hereby incorporated herein by reference.

BACKGROUND

Data from various data acquisition sources (e.g., sensors, detectors, etc.) may be collected to monitor the status of an operation and to make appropriate decisions relating to the completion of the operation. In the context of a drilling operation (e.g., drilling of a wellbore, etc.), any variety of raw data may be collected during the drilling operation (e.g., equipment status, equipment load, torque, temperature, power output, etc.). Drilling operators may need to analyze and interpret this raw data for making proper and appropriate decisions (e.g., equipment control decisions) during the drilling operation.

SUMMARY

Embodiments of the disclosure may provide a method for receiving a selection of a goal for an operation, determining a plan based on the selected goal, determining different types of data to present at different stages of the plan, continuously receiving data representing one or more measurements taken during the operation, identifying a progression of the plan based on the continuously receiving the data, and dynamically presenting the different types of data in an interface at different stages of the plan based on the identifying the progression of the plan. The dynamically presenting the different types of data directs a user's attention to the different types of data relevant at the different stages of the plan.

In an embodiment, the plan includes a series of actions, and the method may include presenting an action previously taken, a current action, and an upcoming action. In embodiments, the determining the plan us further based on a current state. In an embodiment, the determining the different types of data to present at different stages of the plan is based on display parameters. The display parameters may identify at least one of: the locations in the interface to present the different types of data, the layout of the interface, the formatting of the different types of data, and the appearance of the different types of data. In an embodiment, the method may further include displaying an indicator indicating an automatic or manual operating mode. In an embodiment, the operation is a drilling operation Embodiments of the disclosure may also provide a computing system, including one or more processors, and a memory system comprising one or more non-transitory computer-readable media storing instructions that, when executed by at least one of the one or more processors, cause the computing system to: receive a selection of a goal for an operation, determine a plan based on the selected goal, determine different types of data to present at different stages of the plan, wherein the different types of data include subsets of the received data, continuously receive data representing one or more measurements taken during the operation, identify a progression of the plan based on the continuously receiving the data, and dynamically present the different types of data in an interface at different stages of the plan based on the identifying the progression of the plan, wherein the dynamically presenting the different types of data directs a user's attention to the different types of data relevant at the different stages of the plan.

Embodiments of the disclosure may further provide a non-transitory computer-readable medium storing instructions that, when executed by one or more processors of a computing system, cause the computing system to receive a selection of a goal for an operation, determine a plan based on the selected goal, determine different types of data to present at different stages of the plan, wherein the different types of data include subsets of the received data, continuously receive data representing one or more measurements taken during the operation, identify a progression of the plan based on the continuously receiving the data, and dynamically present the different types of data in an interface at different stages of the plan based on the identifying the progression of the plan, wherein the dynamically presenting the different types of data directs a user's attention to the different types of data relevant at the different stages of the plan.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
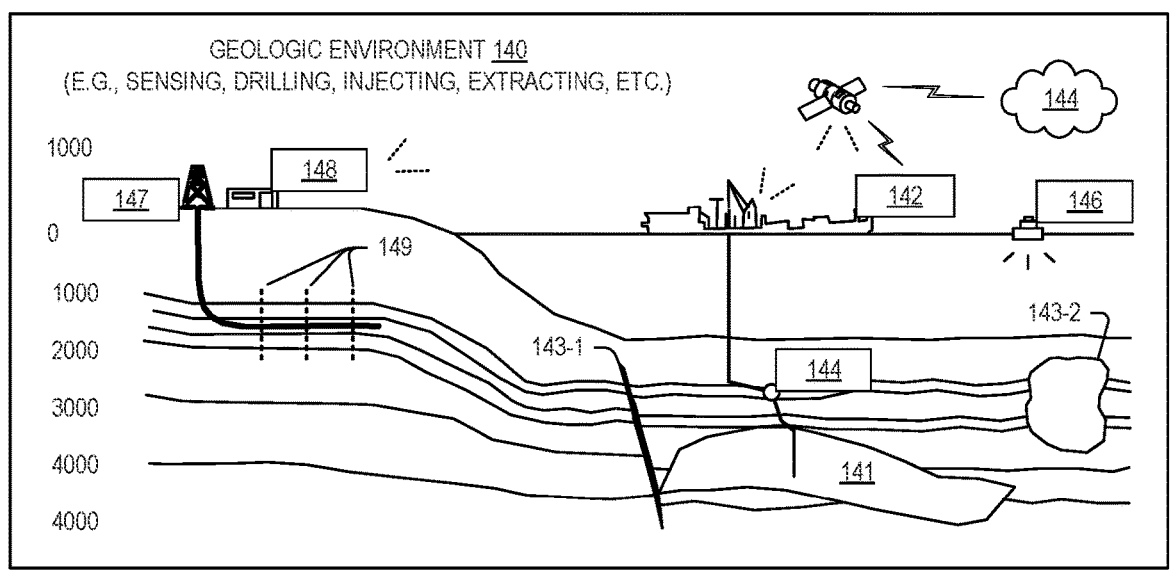
FIG. 1 illustrates an example of a system that includes various management components to manage various aspects of a geologic environment, according to an embodiment.

In the context of a drilling operation (e.g., drilling of a wellbore, etc.), any variety of raw data may be collected during the drilling operation (e.g., equipment status, equipment load, torque, temperature, power output, etc.). The sheer volume of data that is collected and accessible to a user (e.g., a drilling operator) may be overwhelming. That is, the collected data may be so vast to the point where it may be difficult for the user to make sense of the data, monitor the subset of the data that is relevant to a particular stage of a drilling operation at a particular time, or detect a possible problem in the drilling operation. In some instances, pertinent and relevant data may be missed altogether, which may adversely affect the drilling operation. Accordingly, aspects of the present disclosure may include a system and/or method that monitors the progress of a drilling operation, and at each stage during the progression of the drilling operation, identifies or determines a subset of the available data that is relevant at the current stage of the drilling operations, and presents the relevant data in a cohesive, organized, tidy, and sleek manner. As described herein, the "relevant" data may include a select subset of the total available data in which the subset of data has immediate pertinence to an operation (e.g., drilling operation) currently being performed. Thus, aspects of the present disclosure may logically select a subset of total available data to present instead of presenting all available data, which may confuse or overwhelm the user, while inhibiting the user's situational awareness and ability to view and track data that pertains to a current operation.

As the drilling operation progresses, aspects of the present disclosure may dynamically update the data that is presented each stage of the drilling operation. Further, aspects of the present disclosure may determine the appropriate format and manner in which data is to be presented (e.g., in the form of a dial, a slider, a graph, a number, a descriptor, etc.). In this way, the relevant information and data is presented to a user (e.g., a drilling operator). Thus, the user's situational awareness is improved and the user may be better informed as to the status of the drilling operation in order to make more effective decisions regarding drilling efficiency, quality, safety, etc.

As further described herein, aspects of the present disclosure may include a system and/or method to develop a drilling plan based on a current state and a desired end state. The drilling plan may include a series of stages (e.g., actions or sub-actions) to be completed for achieving a selected objective or goal. Aspects of the present disclosure may monitor the progression of the plan, and dynamically update a reporting interface during the progression of the plan such that the reporting interface displays the most relevant set of data at each stage of the drilling operation. Further, aspects of the present disclosure may provide guidance of an operation by presenting a list of actions in a drilling plan, including previous actions taken, a current action, and upcoming actions. In this way, aspects of the present disclosure provide the user with guidance as to the status of the drilling operation.

Aspects of the present disclosure improve a user interface relating to the reporting of data associated with an operation (e.g., a drilling operation). More specifically, aspects of the present disclosure improve the speed, accuracy, and usability of an operations data reporting user interface by presenting the most relevant set of data to the user at a given time during a given point or stage of the operation. That is, the speed in accessing the relevant data is improved, the accuracy of decisions made are improved, and the usability of the user interface for viewing data is improved, as the most relevant data points are presented.

While the systems and/or methods, described herein, are described in the context of providing guidance and reporting relevant data relating to drilling operations, the systems and/or methods are not so limited. For example, the systems and/or methods may be applied to any other variety of operations and tasks in addition to or in alternative of drilling operations.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
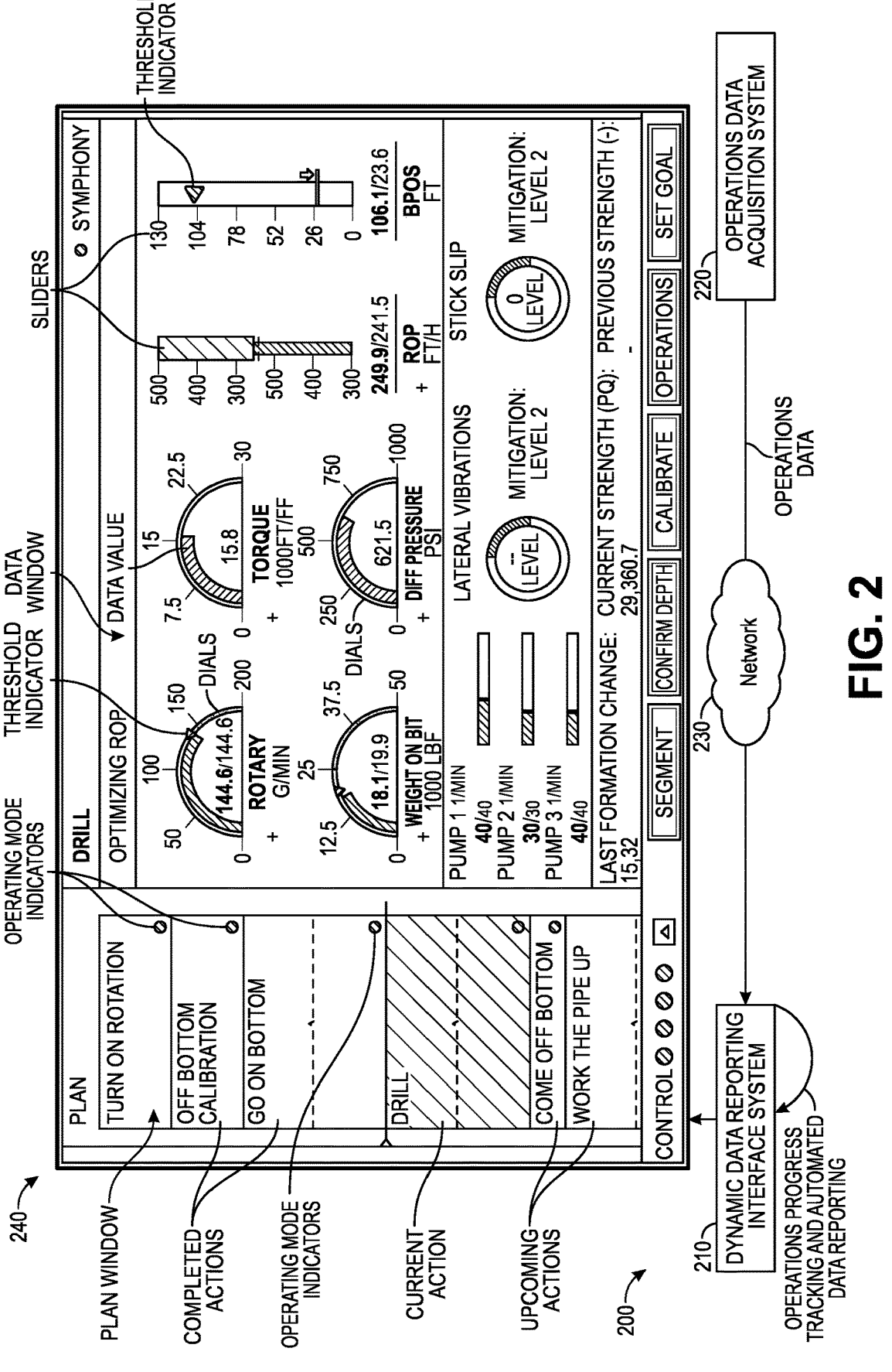
FIG. 2 illustrates an example computing environment, according to an embodiment.

FIG. 2 illustrates an example computing environment 200, according to an embodiment. As shown in FIG. 2, environment 200 includes a dynamic data reporting interface system 210, an operations data acquisition system 220, and a network 230.

The dynamic data reporting interface system 210 may include one or more computing devices that hosts an application that presents relevant data at each stage of an operation (e.g., a drilling operation). As described herein, the "relevant" data may include a select subset of the total available data in which the subset of data has immediate pertinence to an operation (e.g., a drilling operation) currently being performed. In some embodiments, the application may include an interface (e.g., interface 250) displaying an overview of actions or tasks for a plan (e.g., a drilling plan), and data relevant to a current action. In some embodiments, the dynamic data reporting interface system 210 may receive (e.g., from a user or operator) a selection of a goal, determine a plan (e.g., a series of actions) to achieve the goal based on a current state, access display parameters for each action in the plan, and monitor the progression of the plan (e.g., by communicating with the operations data acquisition system 220). In some embodiments, the dynamic data reporting interface system 210 may update the presentation of data based on the progression of the plan, and more specifically, update which data is shown as actions in the plan are completed and subsequent actions in the plan begin. For example, the display parameters may identify which sets or types of data to present for a given action, the format in which to present the data, the locations in the interface 250 to present the data, the layout of the interface 250, and/or other parameters regarding the appearance of the presented data. Also, the dynamic data reporting interface system 210 may present a list of the completed, current, and upcoming actions. In this way, the dynamic data reporting interface system 210 guides the user through the operation (e.g., drilling operation).

The operations data acquisition system 220 may include one or more computing devices that obtain data regarding the performance of an operation (e.g., drilling operation). In some embodiments, the operations data acquisition system 220 may include or communicate with any of the sensing, drilling, injecting, extracting, or other types of devices, such as those shown in the geological environment 150. In some embodiments, the operations data acquisition system 220 may provide any variety of data (e.g., raw unprocessed data and/or processed data) to the dynamic data reporting interface system 210 such that the dynamic data reporting interface system 210 may determine the progression of a drilling operation with respect to a drilling plan. Further, the operations data acquisition system 220 may provide the data to the dynamic data reporting interface system 210 such that the dynamic data reporting interface system 210 may present the data (e.g., in the interface 250).

The network 230 may include network nodes and one or more wired and/or wireless networks. For example, the network 230 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 230 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks;

different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

The dynamic data reporting interface system 210 may communicate with the operations data acquisition system 220 to obtain data relating to the progression of a drilling operation (e.g., the actions that a drilling system is taking as part of a drilling operation, sensor readings, equipment control information, equipment readings, etc.). In some embodiments, the dynamic data reporting interface system 210 may track the progress of an operation and present/report relevant data for a current action in an interface (e.g., the interface 250). As shown in FIG. 2, the interface 250 may include a plan window identifying a series of actions in a plan (e.g., a drilling plan). The plan window may identify completed actions, a current action, and upcoming actions. In this way, a user (e.g., a drilling operator) may easily identify the current status of the plan and be made aware of subsequent steps to be performed.

As further shown in FIG. 2, the interface 250 may further include a data window. The data window may include any variety of data that may be of relevance to the operator at the current action of the plan. That is, as the plan progresses, the data shown in the data window may also change. As described herein, the data shown may change based on the current action. In some embodiments, the data may be presented in the form of a dial, a slider, a graph, a value, a descriptor, or a combination thereof. As further shown in FIG. 2, threshold values for each type of data may be shown. In this way, the user may observe whether data values are within acceptable thresholds, and take appropriate actions if outside the thresholds.

In some embodiments, the interface 250 may further include operating mode indicators. The operating mode indicators may identify whether an action is being performed in automatic mode, manual mode, or hybrid mode (partially automatic and partially manual). For example, certain actions may be performed in automatic mode by equipment configured to control drilling equipment automatically (e.g., based on a program and/or with limited or reduced user interaction). The operating mode indicators may be represented by different shapes, colors, icons, shadings, or patterns to indicate different operating modes (e.g., automatic, manual, or hybrid). In some embodiments, the threshold indicators may be represented by different shapes, colors, icons, shadings, or patterns to indicate whether the thresholds are managed manually or automatically, or whether the actions are being managed automatically such that the data produced by the actions are within the thresholds. It this way, the user may be made aware of particular items or tasks that are being handled automatically, and that the data values for these tasks remain within particular thresholds. Thus, the user may direct additional attention to manual tasks for which actions may need to be manually taken in order for data values to remain within thresholds. Further, the user may verify or check whether the operations being performed automatically are being performed as expected or in accordance with operating specifications. The user may take note of and/or modify automatic control algorithms when automatic operations do not perform as expected or in accordance with operating specifications.

That is, the operating mode indicator may allow a user may determine whether an automatic mode is functioning properly.

In the example shown in FIG. 2, the interface 250 shows a drilling plan with a list of actions. The current action shown in the example interface 250 is a drilling action that is currently being performed in automatic mode. As shown, the interface 250 reports that the drilling system is currently calculating one or more factors that contribute to a calculation of a rate of penetration (ROP). Further, the interface 250 reports data, such as rotary measurements, torque measurements, weight on bit measurements, differential pressure measurements, lateral vibration measurements, and/or stick-slip measurements. The interface 250 may report other data as shown in FIG. 2, as well as other types of data not shown or described herein. As the drilling operation progresses, the types of data shown may update, as will be described in greater detail below.

The interface 250 presents an overview of relevant data (e.g., a select subset of total available data) at a given point or stage in a drilling plan. That is to say, the available data may be pruned or down-selected such that a subset of the available data (e.g., the data pertinent for a current action) is presented at a given time. In this way, instead of the user being inundated or overwhelmed with an excessive volume of data that may not be of immediate relevance, the user is presented with a streamlined interface having the most relevant data at a given time for a given action. As such, the user's situational awareness of an operation is improved, thereby improving drilling-related decisions, drilling controls, drilling efficiency, quality, and/or safety. In some embodiments, the layout, appearance, and types of data shown for a given action may be customizable for a user or group of users (e.g., based on job roles, areas of expertise, etc.).

Figure 3A:
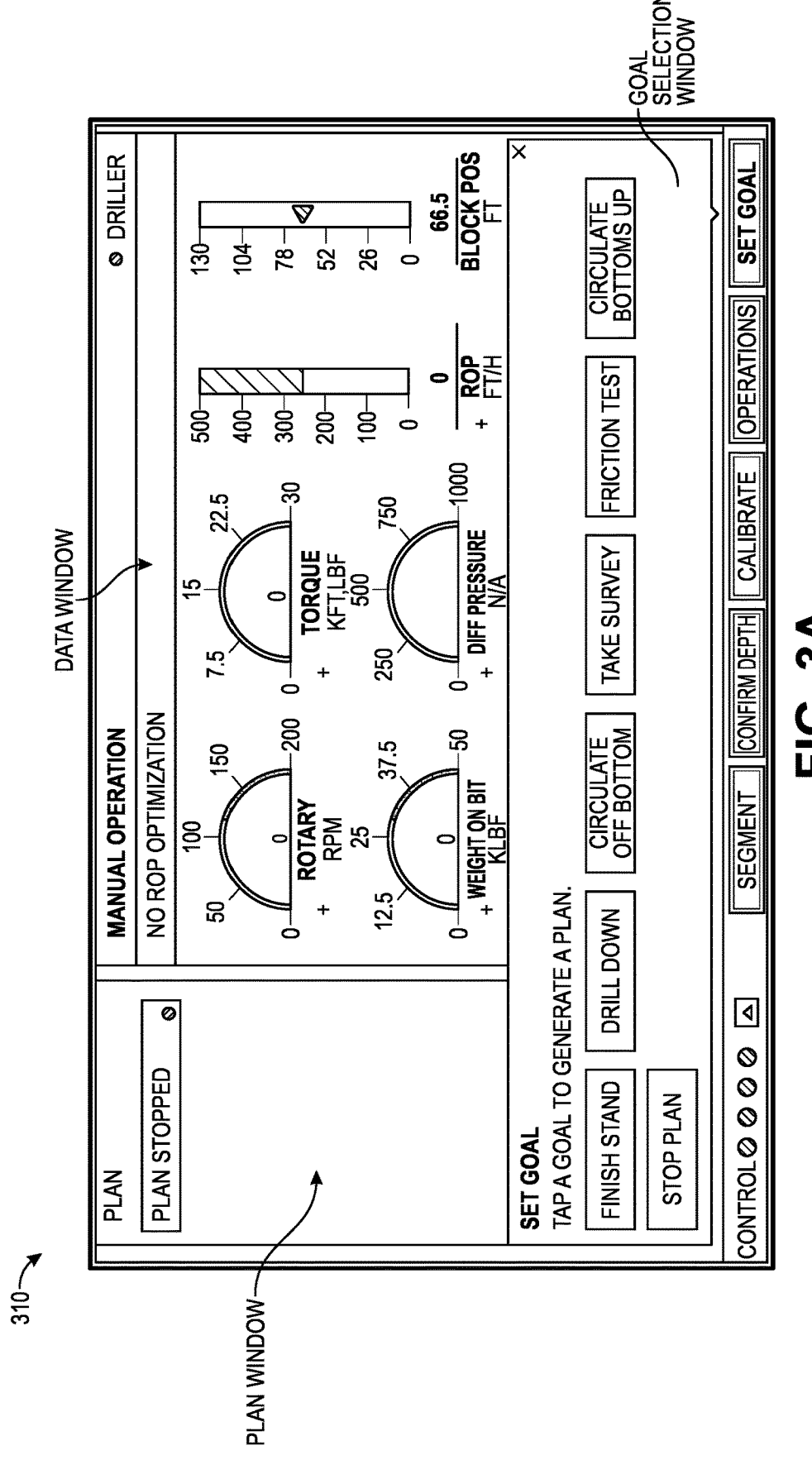
FIGS. 3A-3E illustrate the functionality of an application for updating the presentation of data as a plan progresses over time, according to an embodiment.

FIGS. 3A-3E illustrate functionality of an application (e.g., hosted by the dynamic data reporting interface system 210) for updating the presentation of data as a plan progresses over time. Referring to FIG. 3A, upon initial execution of the application, an interface may be presented (e.g., the interface 310). The interface 310 may include a goal selection window in which a user (e.g., operator) may select a goal or objective to be completed (e.g., in connection with performing a drilling operation). Example goals that may be selected include finishing a stand, drilling down, circulating off bottom, taking a survey, performing a friction test, circulate bottoms up, or discontinuing an existing plan. In practice, other goals may be defined and presented. As a goal has not yet been selected, no data is yet presented in the data window, and no actions are yet presented in the plan windows. In the example of FIG. 3A, the user may select the "drill down" goal (e.g., in order to drill downwardly for creating a wellbore).

Figure 3B:
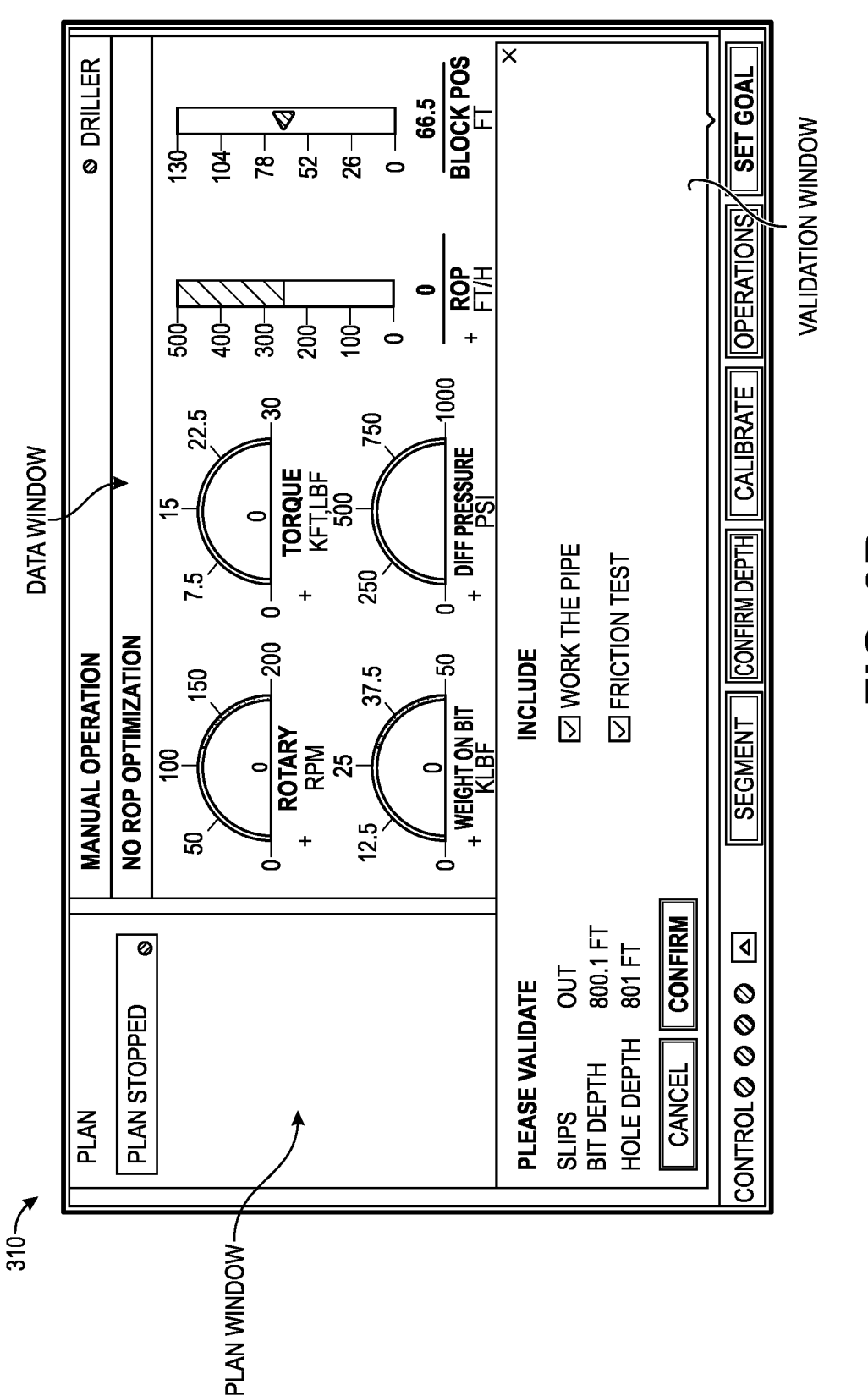

Referring to FIG. 3B, a validation window may be presented in which the user may validate or confirm a set of initial data (e.g., to ensure that data representing a current state is arcuate). As one illustrative example, the validation window may ask the user to confirm slip position, bit depth, hole depth, and to confirm the selection of task options (e.g., an option to "work the pipe" and/or an option to perform a friction test). Upon selection of a goal and validation of initial data, the dynamic data reporting interface system 210 may generate a plan (e.g., a series of actions to take for meeting the goal).

Figure 3C:
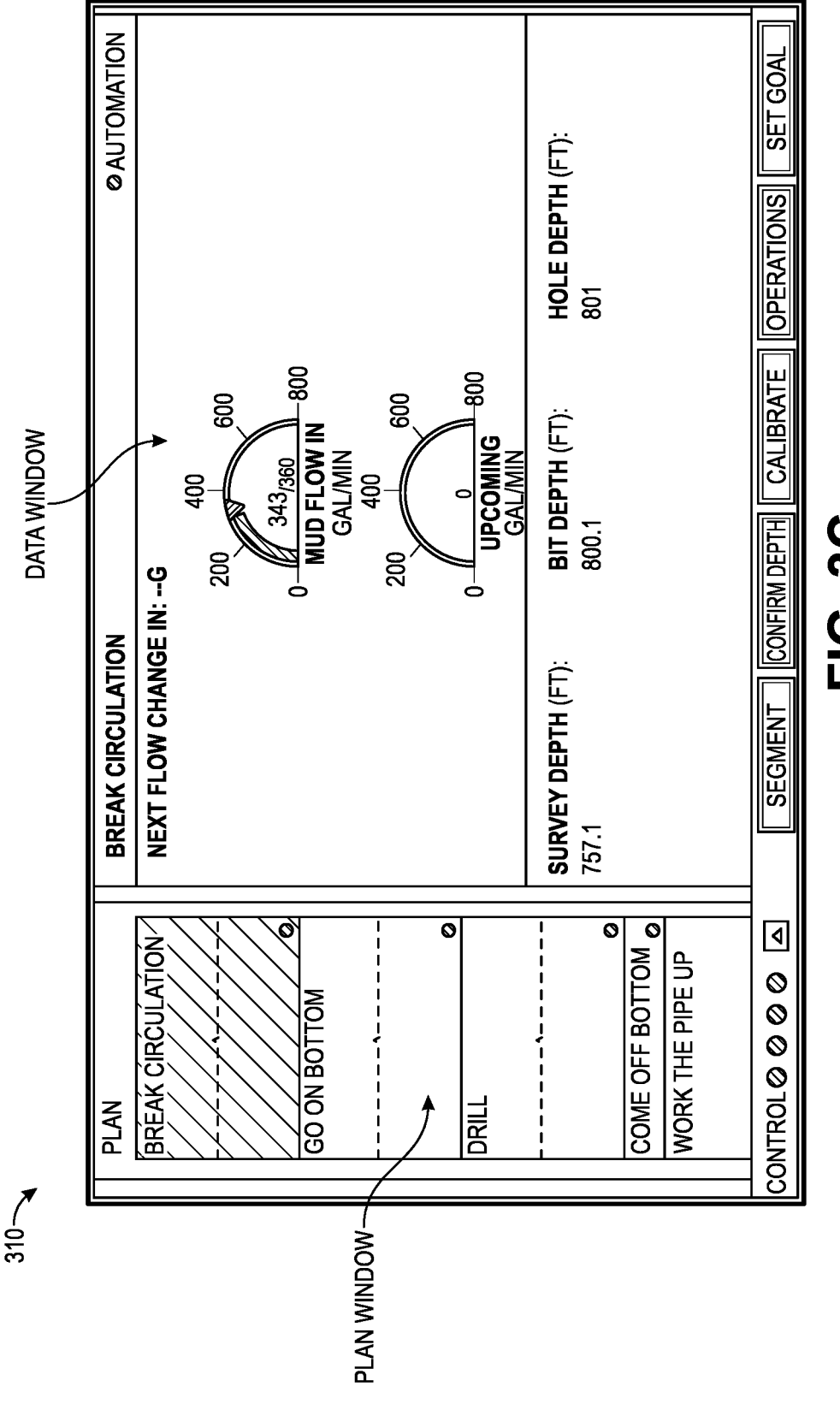
Figure 3D:
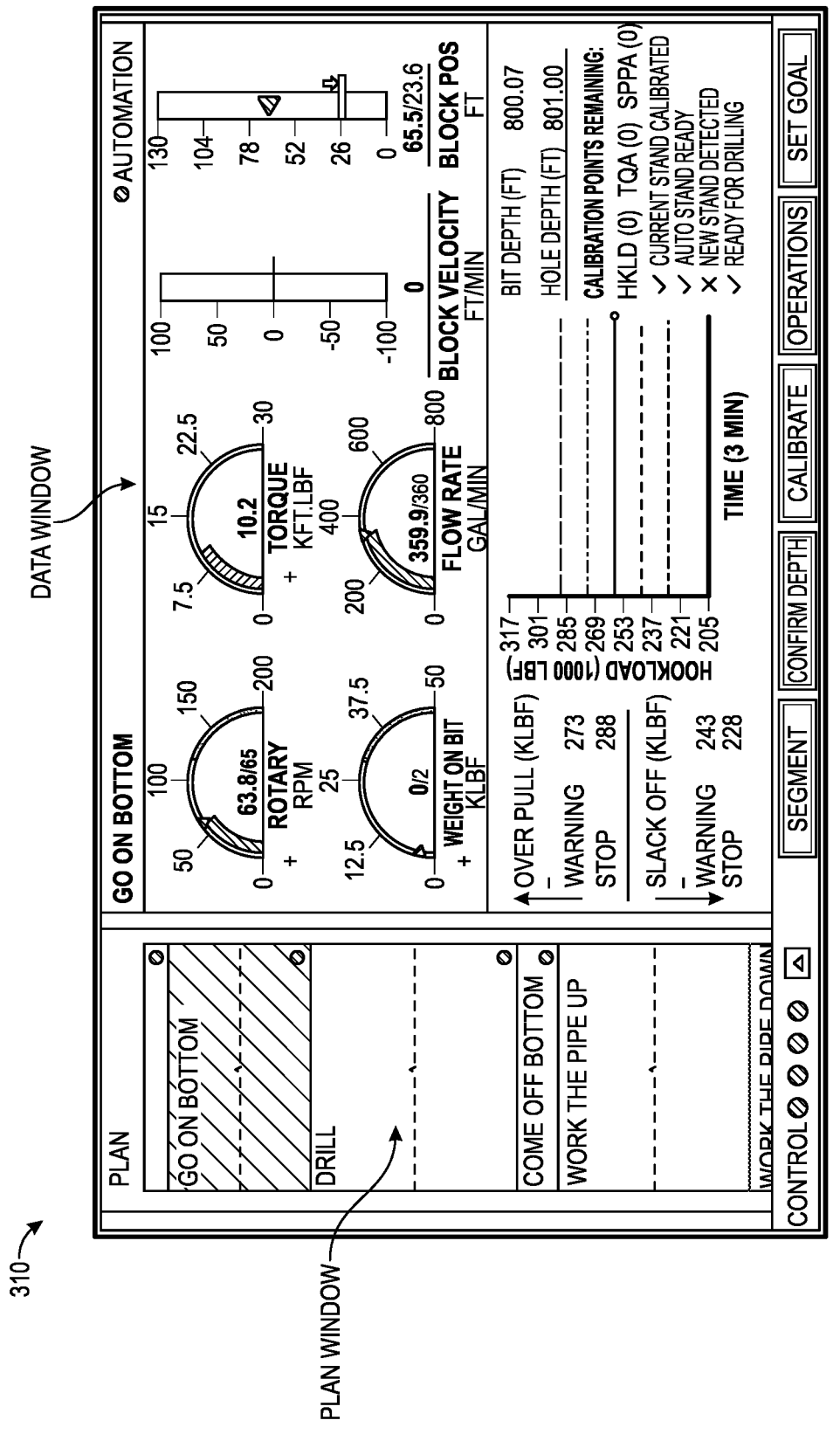
Figure 3E:
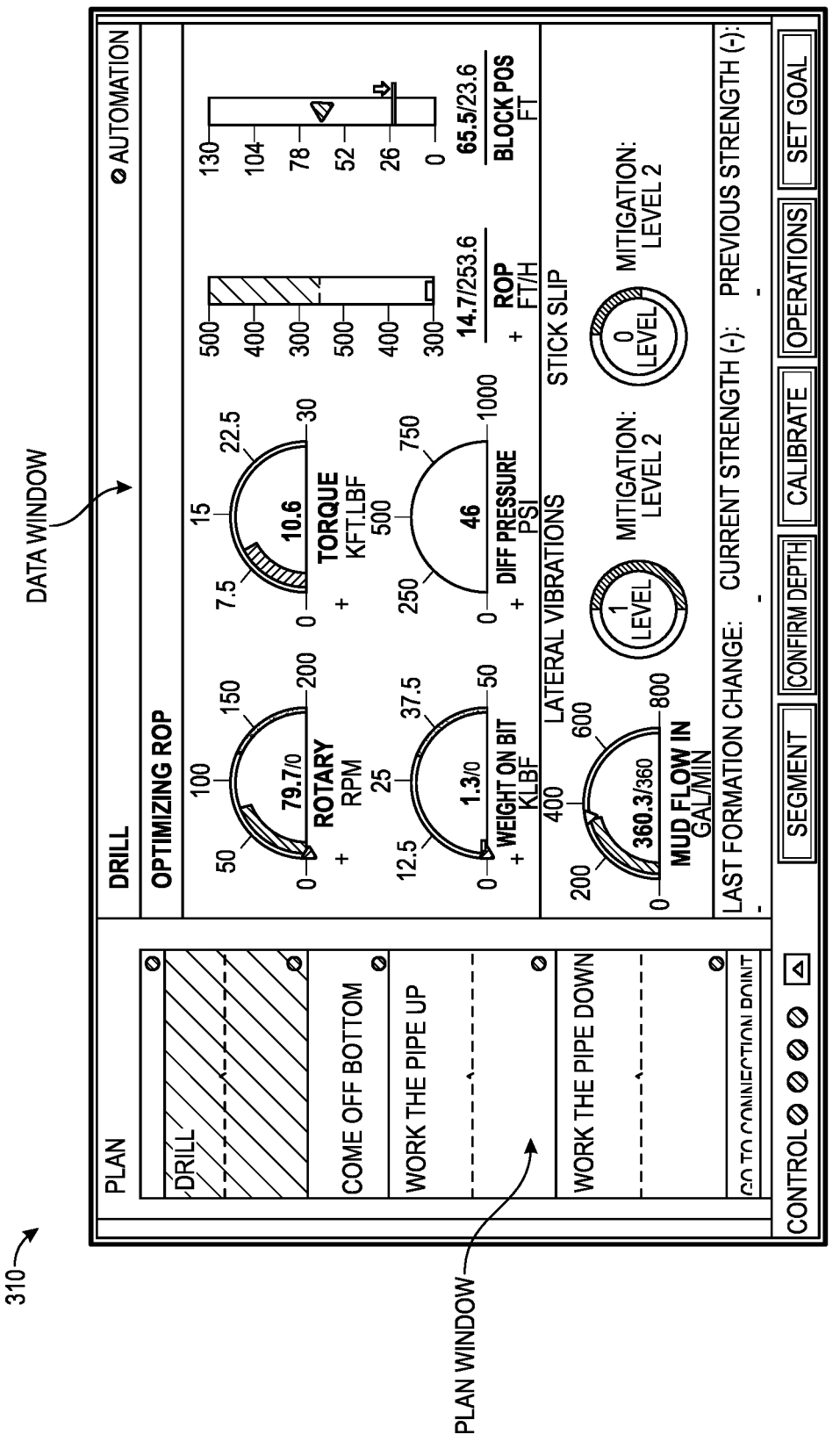

Referring to FIG. 3C, the plan may be presented in the plan window, and the first action in the plan may be highlighted (e.g., to indicate that the first action is currently being performed). In the example shown in FIG. 3C, the list of actions in the plan may include "break circulation," "go on bottom," "drill," "come off bottom," and "work the pipe up." As further shown in the example of FIG. 3C, the interface 310 may present a subset of the available data relevant to the current action of "break circulation." In the example shown in FIG. 3C, the interface 310 may present mud flow in, upcoming mud flow, fluid flow measurements, survey depth, bit depth, and hole depth. In some embodiments, the time for a subsequent flow change may be shown. As described herein, at each stage of the drilling operation, the dynamic data reporting interface system 210 may determine the particular data to show, the format of the data, and the layout of the data in the interface 310 based on display parameters stored in a data structure.

As the drilling operation progresses, different data may be presented that is relevant to different stages of the drilling operation (e.g., subsequent actions or subphases of a particular action). For example, referring to FIG. 3D, additional data may be shown for the "go on bottom" action. Example data may include rotary measurements, torque measurements, weight on bit measurements, flow rate measurements, block velocity measurements, hookload vs. time measurements, hole depth measurements; hookload measurements; block position; stand down position; block velocity; tool face; and limits, constrains, and targets etc.

Upon completion of the "go on bottom" action and as the operation progresses to a subsequent action (e.g., the "drill" action), the interface 310 may be updates to present data relevant to the drill action. For example, referring to FIG. 3E, the interface 310 may be updated to present a different set of data than those shown for the previous actions. As the operation progresses, the data shown may continue to update in accordance with display parameters defining which data to show at each state of the drilling operation. In this way, the dynamic data reporting interface system 210 provides guidance to the user (e.g., operator) by presenting the user with the most relevant data rather than the entirety of all available, thereby improving the user's situational awareness and effectiveness for ensuring that the drilling operation is proceeding efficiently and safely.

Figure 4:
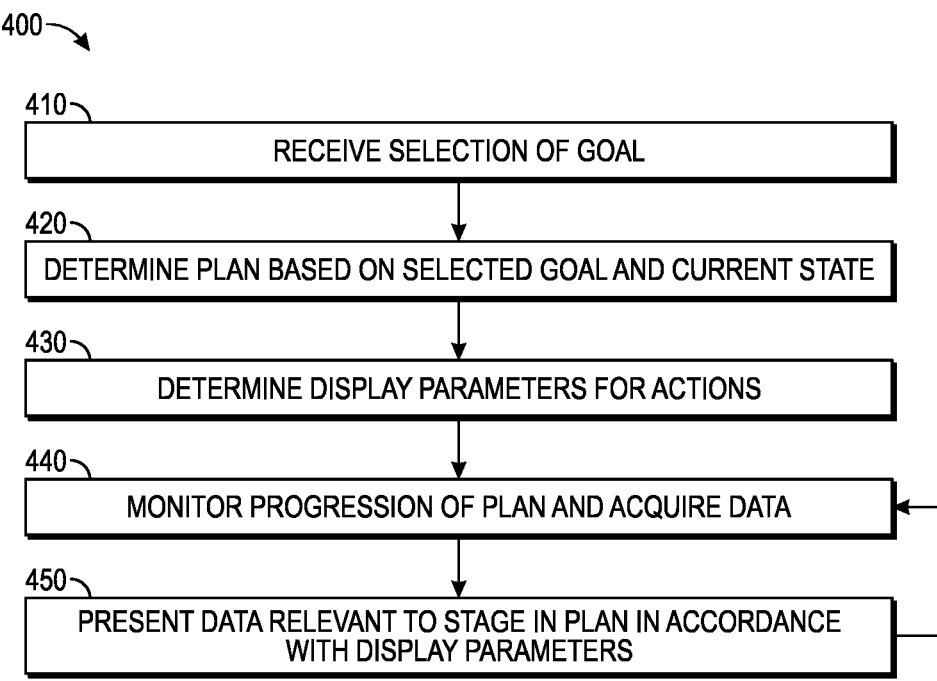
FIG. 4 illustrates a flowchart of a process for presenting relevant data based on monitoring and tracking the progression of a plan, according to an embodiment.

FIG. 4 illustrates an example flowchart of a process 400 for presenting relevant data based on monitoring and tracking the progression of a plan. The blocks of FIG. 4 may be implemented in the environment 200 of FIG. 2, for example, and are described using reference numbers of elements depicted in FIG. 2. The flowchart illustrates the architecture, functionality, and operation of possible implementations of systems, methods, and computer program products according to various embodiments of the present disclosure. As described herein, the process 400 may be initiated upon the opening of an application used to monitor and track the progression of actions and to display relevant data.

As shown in FIG. 4, the process 400 may include receiving a selection of a goal (as at 410). For example, the dynamic data reporting interface system 210 may receive a selection of a goal (e.g., a drilling objective, such as a goal to drill downward, perform a survey, perform a friction test, circulate off bottom, etc.). An example of receiving a selection of a goal is shown in FIG. 3A.

The process 400 also may include determining a plan based on selected goal and current state (as at 420). For example, the dynamic data reporting interface system 210 may determine a plan (e.g., a series of stages, such as actions, or sub-actions) based on the selected goal and a current state. As one illustrative example, assume that the goal is to drill a wellbore along a particular path. The current state may be identified based on any existing drilling progress, geological considerations, equipment capabilities and constraints, equipment health, and the planned path of the wellbore. The dynamic data reporting interface system 210 may determine the series of actions to take in order to complete drilling of the wellbore.

The process 400 further may include determining display parameters for actions (as at 430). For example, the dynamic data reporting interface system 210 may determine display parameters for the actions in the plan. In some embodiments, the dynamic data reporting interface system 210 may access a repository or data structure that stores information identifying the display parameters for the actions, sub-actions, and/or stages in the plan. In some embodiments, the display parameters identify the layout and locations in the interface of where data should be presented, the types of data to present (e.g., a subset of all the available data relevant to a particular action), the format of the data, etc. That is, the dynamic data reporting interface system 210 may determine the different types of data to present at different stages of the plan, and the appearance/formatting of which the different types of data are to be presented. As described herein, the display parameters may be predetermined and/or customizable for a user or group of users.

The process 400 also may include monitoring progression of the plan and acquiring data (as at 440). For example, the dynamic data reporting interface system 210 may monitor progression of the plan and acquire data by actively and/or continuously communicating with the operations data acquisition system 220. As previously discussed, the operations data acquisition system 220 may gather data relating to drilling operations (e.g., drilling operation progress, raw data relating to the drilling operations, etc.). Thus, by actively communicating with the operations data acquisition system 220, the dynamic data reporting interface system 210 may monitor the progression of the plan and continuously obtain data relevant to the plan. More specifically, by continuously receiving the data relating to the drilling operations, the data reporting interface system 210 may monitor the progression of an action to determine the level to which an action or stage of the plan has been completed.

The process 400 further may include presenting data relevant to the stage in the plan in accordance with the display parameters (as at 450). For example, the dynamic data reporting interface system 210 may present data relevant to the stage in the plan in accordance with the display parameters. That is, the dynamic data reporting interface system 210 may present the data for the current stage (e.g., current action or sub-action) and may present the data in accordance with the display parameters. As previously discussed, the display parameters may identify the layout and locations in the interface of where data should be presented, the types of data to present (e.g., a subset of all the available data relevant to a particular action), the format of the data, etc. Thus, the dynamic data reporting interface system 210 may present the subset of relevant to the current action being taken and may present the subset of data in a particular location, format, and/or appearance as defined by the display parameters. That is, the dynamic data reporting interface system 210 may not present the entirety of all available data so as to overwhelm the user with the sheer volume of data (although the user may optionally select to view any available data at any time). By presenting a subset of the total available data (e.g., the most relevant information at a given stage in the drilling operation), the operator's situational awareness is improved, as the operator's attention may be directed towards the data that is relevant at different stages of the drilling plan. As a result, the operator may be better informed as to the status of the drilling operation in order to make more effective decisions regarding drilling efficiency, quality, safety, etc.

As further shown in FIG. 4, the process 400 may return to block 440 in which the dynamic data reporting interface system 210 may continue to monitor the progression of the plan and acquire data. Further, process 400 may return to block 450 in which the dynamic data reporting interface system 210 may present data relative to the actions as the plan progresses. In this way, the dynamic data reporting interface system 210 may dynamically present different types of data as the plan progresses from stage to stage. That is, the dynamic data reporting interface system 210 may dynamically report and present the most relevant data to the user as the plan progresses. Further, as shown in FIGS. 3A-3E, the dynamic data reporting interface system 210 may display the plan's progress over time, including actions completed, current actions, and upcoming actions. In this way, the user's situational awareness is improved, thereby allowing the user to more effectively monitor plan operations, progress, and improve drilling plan efficiency, quality, and/or safety.

In some embodiments, as plan progression is monitored, process 400 may return to block 420 in the event that a planned action fails or is not properly taken. In this situation, a new plan may be determined at block 420 for executing an updated plan, displaying the corresponding parameters, and monitoring the progression of the updated plan.

Figure 5:
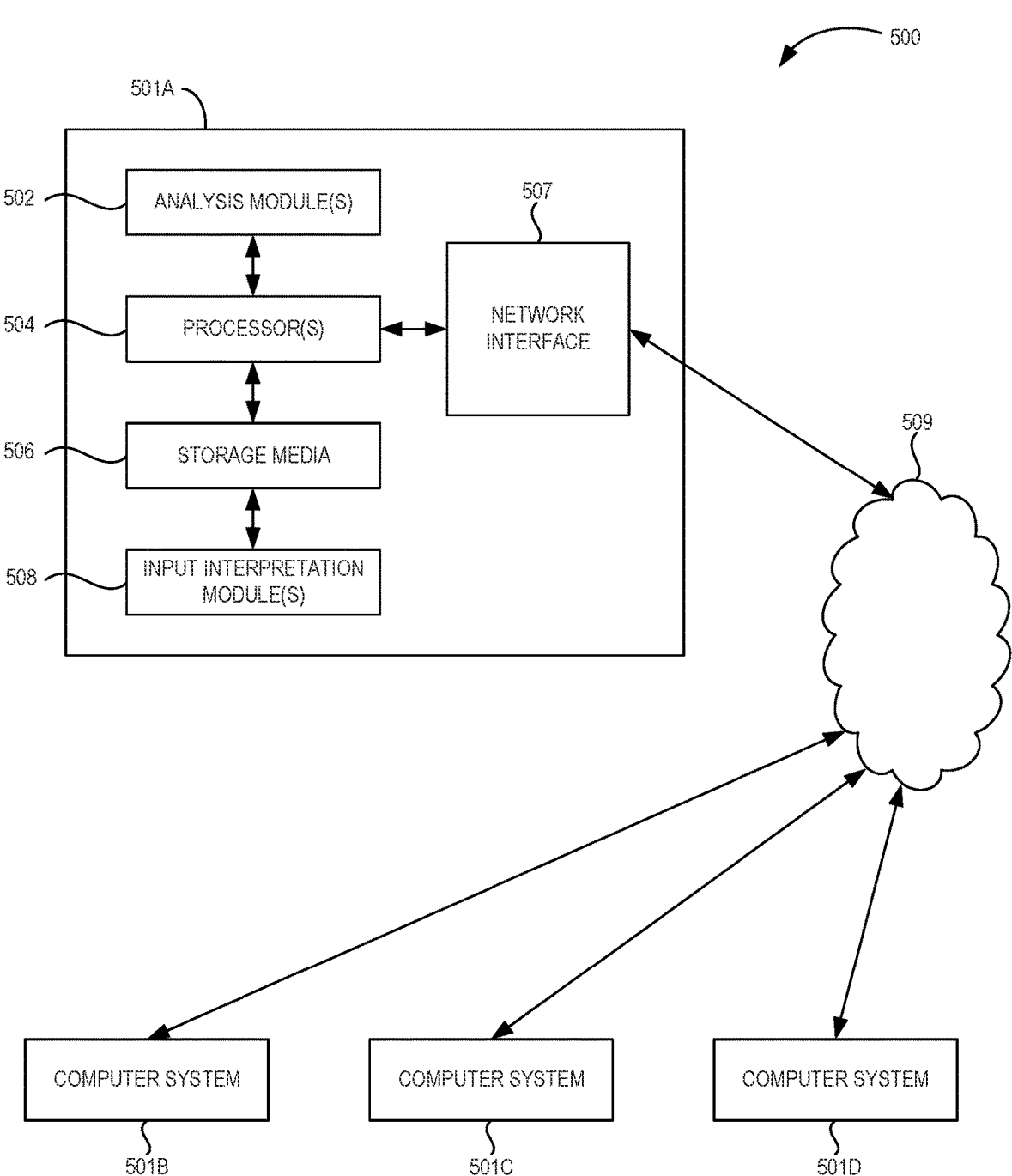
FIG. 5 illustrates a schematic view of a computing system, according to an embodiment.

In some embodiments, the methods of the present disclosure may be executed by a computing system. FIG. 5 illustrates an example of such a computing system 500, in accordance with some embodiments. The computing system 500 may include a computer or computer system 501A, which may be an individual computer system 501A or an arrangement of distributed computer systems. The computer system 501A includes one or more analysis modules 502 that are configured to perform various tasks according to some embodiments, such as one or more methods disclosed herein. To perform these various tasks, the analysis module 602 executes independently, or in coordination with, one or more processors 504, which is (or are) connected to one or more storage media 506. The processor(s) 504 is (or are) also connected to a network interface 507 to allow the computer system 501A to communicate over a data network 509 with one or more additional computer systems and/or computing systems, such as 501B, 501C, and/or 501D (note that computer systems 501B, 501C and/or 501D may or may not share the same architecture as computer system 501A, and may be located in different physical locations, e.g., computer systems 501A and 501B may be located in a processing facility, while in communication with one or more computer systems such as 501C and/or 501D that are located in one or more data centers, and/or located in varying countries on different continents).

A processor may include a microprocessor, microcontroller, processor module or subsystem, programmable integrated circuit, programmable gate array, or another control or computing device.

The storage media 506 may be implemented as one or more computer-readable or machine-readable storage media. Note that while in the example embodiment of FIG. 5 storage media 506 is depicted as within computer system 501A, in some embodiments, storage media 506 may be distributed within and/or across multiple internal and/or external enclosures of computing system 501A and/or additional computing systems. Storage media 506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 500 contains one or more dynamic data reporting module(s) 508. In the example of computing system 500, computer system 501A includes the dynamic data reporting module 508. In some embodiments, a single dynamic data reporting module 508 may be used to perform some aspects of one or more embodiments of the methods disclosed herein. In other embodiments, a plurality of dynamic data reporting modules 508 may be used to perform some aspects of methods herein.

It should be appreciated that computing system 500 is merely one example of a computing system, and that computing system 500 may have more or fewer components than shown, may combine additional components not depicted in the example embodiment of FIG. 5, and/or computing system 500 may have a different configuration or arrangement of the components depicted in FIG. 5. The various components shown in FIG. 5 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure. Computational interpretations, models, and/or other interpretation aids may be refined in an iterative fashion; this concept is applicable to the methods discussed herein. This may include use of feedback loops executed on an algorithmic basis, such as at a computing device (e.g., computing system 500, FIG. 5), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A computer-implemented method, comprising:
receiving a selection of a goal for an operation;
determining a first plan based on the selection of the goal;
determining different types of data to present at different stages of the first plan, the different stages comprising a first stage, a second stage, and a third stage, wherein the different types of data include subsets of received data, the subsets comprising a first subset relevant to the first stage, a second subset relevant to the second stage, and a third subset relevant to the third stage;
continuously receiving data representing one or more measurements taken during the operation;
identifying a progression of the first plan based on the continuously receiving the data;
displaying a first plan window indicating the first stage, the second stage, and the third stage, wherein the first stage comprises a completed stage of the first plan, the second stage comprises a current stage of the first plan, and the third stage comprises a first future stage of the first plan displayed adjacent the second stage, wherein:
the current stage comprises a go on bottom action, wherein the go on bottom action comprises lowering a drill to a bottom of a wellbore; and
the first future stage comprises a drill down action, wherein the drill down action comprises moving the drill downwardly for creating the wellbore;
dynamically displaying the different types of data in an interface at the different stages of the first plan based on the identifying the progression of the first plan including displaying the second subset adjacent the first plan window, wherein the dynamically displaying the different types of data directs a user's attention to the different types of data relevant at the different stages of the first plan;
determining the current stage of the first plan has failed based on the third subset relevant to the third stage;
generating a second plan based on the determining the current stage of the first plan has failed;
displaying the second plan in a second plan window, wherein:
the second plan comprises the first stage, the second stage, and a fourth stage;
the fourth stage comprises a second future stage configured to be carried out subsequent to the second stage;
the second future stage comprises a come off bottom action, wherein the come off bottom action comprises moving the drill upwardly from the bottom of the wellbore; and
the displaying the second plan comprises displaying the first stage, the second stage, and the fourth stage adjacent the second stage; and
displaying a validation window comprising an option for a user to confirm initial data relevant to the fourth stage.

2. The method of claim 1, wherein the determining the first plan is further based on a current state, wherein the current state identifies previous progress toward the goal.

3. The method of claim 1, wherein the operation comprises a drilling operation, the dynamically displaying the different types of data comprises down-selecting the different types of data from a total set of data available for the drilling operation to improve a user's situational awareness of the drilling operation.

4. The method of claim 3, wherein the continuously received data comprises at least one selected from the group consisting of:
rotary measurements;
torque measurements;
weight on bit measurements;
diff pressure measurements;
lateral vibration measurements;
stick slip measurements;
fluid flow measurements;
survey depth measurements;
bit depth measurements;
hole depth measurements;
hookload measurements;
block position;
stand down position;
block velocity;
tool face; and
limits, constraints, and targets.

5. The method of claim 1, wherein the determining the different types of data to present at the different stages of the first plan is based on display parameters, wherein the display parameters identify at least one in the group consisting of:
locations in the interface to present the different types of data;
a layout of the interface;
a formatting of the different types of data; and
an appearance of the different types of data.

6. The method of claim 1, further comprising displaying an indicator indicating whether the operation is operating in an automatic mode or a manual operating mode, wherein the automatic mode includes a mode in which the operation is being performed with limited or reduced user interaction, the indicator informing the user whether the automatic mode is functioning properly.

7. The method of claim 1, wherein the identifying the progression of the first plan comprises actively communicating with an operations data acquisition system that includes or communicates with sensors used in the operation.

8. The method of claim 1, wherein the come off bottom action comprises moving the drill upwardly from the bottom of the wellbore before drilling has occurred.

9. The method of claim 1, wherein the displaying the second plan comprises adjusting display parameters based on the generating the second plan.

10. The method of claim 9, wherein the display parameters are predetermined and customizable.

11. The method of claim 9, wherein the display parameters comprise:
a format of the data; and
a layout including locations where the data is displayed on the interface.

12. A computing system, comprising:
one or more processors; and
a memory system comprising one or more non-transitory computer-readable media storing instructions that, when executed by at least one of the one or more processors, cause the computing system to:
receive a selection of a goal for an operation;
determine a first plan based on the selection of the goal;

determine different types of data to present at different stages of the first plan, the different stages comprising a first stage, a second stage, and a third stage, wherein the different types of data include subsets of received data, the subsets comprising a first subset relevant to the first stage, a second subset relevant to the second stage, and a third subset relevant to the third stage;

continuously receive data representing one or more measurements taken during the operation;

identify a progression of the first plan based on the continuously receiving the data;

display a first plan window indicating the first stage, the second stage, and the third stage, wherein the first stage comprises a completed stage of the first plan, the second stage comprises a current stage of the first plan, and the third stage comprises a first future stage of the first plan displayed adjacent the second stage, wherein:

the current stage comprises a go on bottom action, wherein the go on bottom action comprises lowering a drill to a bottom of a wellbore; and the first future stage comprises a drill down action, wherein the drill down action comprises moving the drill downwardly for creating the wellbore;

dynamically display the different types of data in an interface at the different stages of the first plan based on the identifying the progression of the first plan including displaying the second subset adjacent the first plan window, wherein the dynamically displaying the different types of data directs a user's attention to the different types of data relevant at the different stages of the first plan;

determine the current stage of the first plan has failed based on the third subset relevant to the third stage;

generate a second plan based on the determining the current stage of the first plan has failed;

display the second plan in a second plan window, wherein:

the second plan comprises the first stage, the second stage, and a fourth stage;

the fourth stage comprises a second future stage configured to be carried out subsequent to the second stage;

the second future stage comprises a come off bottom action, wherein the come off bottom action comprises moving the drill upwardly from the bottom of the wellbore; and the displaying the second plan comprises displaying the first stage, the second stage, and the fourth stage adjacent the second stage; and display a validation window comprising an option for a user to confirm initial data relevant to the fourth stage.

13. The computing system of claim 12, wherein the determining the first plan is further based on a current state, wherein the current state identifies previous progress toward the goal.

14. The computing system of claim 12, wherein the determining the different types of data to present at the different stages of the first plan is based on display parameters, wherein the display parameters identify at least one in the group consisting of:

locations in the interface to present the different types of data;

a layout of the interface;

a formatting of the different types of data; and an appearance of the different types of data.

15. The computing system of claim 12, wherein the operation comprises a drilling operation, the dynamically displaying the different types of data comprises down-selecting the different types of data from a total set of data available for the drilling operation to improve a user's situational awareness of the drilling operation.

16. The computing system of claim 15, wherein the data regarding the operation comprises at least one selected from the group consisting of:

rotary measurements;

torque measurements;

weight on bit measurements;

diff pressure measurements;

lateral vibration measurements;

stick slip measurements;

fluid flow measurements;

survey depth measurements;

bit depth measurements;

hole depth measurements;

hookload measurements;

block position;

stand down position;

block velocity;

tool face; and limits, constraints, and targets.

17. The computing system of claim 12, wherein the instructions further cause the computing system to display an indicator indicating an automatic mode or a manual operating mode, wherein the automatic mode includes a mode in which the operation is being performed with limited or reduced user interaction, the indicator informing the user whether the automatic mode is functioning properly.

18. A non-transitory computer-readable medium storing instructions that, when executed by one or more processors of a computing system, cause the computing system to:

receive a selection of a goal for an operation;

determine a first plan based on the selection of the goal;

determine different types of data to present at different stages of the first plan, the different stages comprising a first stage, a second stage, and a third stage, wherein the different types of data include subsets of received data, the subsets comprising a first subset relevant to the first stage, a second subset relevant to the second stage, and a third subset relevant to the third stage;

continuously receive data representing one or more measurements taken during the operation;

identify a progression of the first plan based on the continuously receiving the data;

display a first plan window indicating the first stage, the second stage, and the third stage, wherein the first stage comprises a completed stage of the first plan, the second stage comprises a current stage of the first plan, and the third stage comprises a first future stage of the first plan displayed adjacent the second stage, wherein:

the current stage comprises a go on bottom action, wherein the go on bottom action comprises lowering a drill to a bottom of a wellbore; and the first future stage comprises a drill down action, wherein the drill down action comprises moving the drill downwardly for creating the wellbore;

dynamically display the different types of data in an interface at the different stages of the first plan based on the identifying the progression of the first plan including displaying the second subset adjacent the first plan window, wherein the dynamically displaying the different types of data directs a user's attention to the different types of data relevant at the different stages of the first plan;

determine the current stage of the first plan has failed based on the third subset relevant to the third stage;

generate a second plan based on the determining the current stage of the first plan has failed;

display the second plan in a second plan window, wherein:

the second plan comprises the first stage, the second stage, and a fourth stage;

the fourth stage comprises a second future stage configured to be carried out subsequent to the second stage;

the second future stage comprises a come off bottom action, wherein the come off bottom action comprises moving the drill upwardly from the bottom of the wellbore; and the displaying the second plan comprises displaying the first stage, the second stage, and the fourth stage adjacent the second stage; and display a validation window comprising an option for a user to confirm initial data relevant to the fourth stage.

19. The computer-readable medium of claim 18, wherein the determining the first plan is further based on a current state, wherein the current state identifies previous progress toward the goal.

20. The computer-readable medium of claim 18, wherein the determining the different types of data to present at the different stages of the first plan is based on display parameters, wherein the display parameters identify at least one in the group consisting of:

locations in the interface to present the different types of data;

a layout of the interface;

a formatting of the different types of data; and an appearance of the different types of data.

21. The computer-readable medium of claim 18, wherein the data regarding the operation comprises at least one selected from the group consisting of:

rotary measurements;

torque measurements;

weight on bit measurements;

diff pressure measurements;

lateral vibration measurements;

stick slip measurements;

fluid flow measurements;

survey depth measurements;

bit depth measurements;

hole depth measurements;

hookload measurements;

block position;

stand down position;

block velocity;

tool face; and limits, constraints, and targets.

* * * * *